(12) United States Patent
Korotkov

(10) Patent No.: US 9,075,093 B2
(45) Date of Patent: Jul. 7, 2015

(54) DEVICE FOR MEASURING ELECTROMAGNETIC FIELD INTENSITY

(76) Inventor: Konstantin G. Korotkov, Saint-Petersburg (RU)

( * ) Notice: Subject to any disclaimer, the term of this patent is extended or adjusted under 35 U.S.C. 154(b) by 77 days.

(21) Appl. No.: 13/808,725

(22) PCT Filed: Dec. 17, 2010

(86) PCT No.: PCT/RU2010/000766
§ 371 (c)(1),
(2), (4) Date: Jan. 7, 2013

(87) PCT Pub. No.: WO2012/005620
PCT Pub. Date: Jan. 12, 2012

(65) Prior Publication Data
US 2013/0113462 A1    May 9, 2013

(30) Foreign Application Priority Data
Jul. 8, 2010  (RU) ................................ 2010128376

(51) Int. Cl.
*G01R 13/04*     (2006.01)
*G01R 29/08*     (2006.01)
*G02B 1/00*      (2006.01)
*G01R 33/028*    (2006.01)

(52) U.S. Cl.
CPC .............. *G01R 29/0878* (2013.01); *G02B 1/00* (2013.01); *G06Q 2230/00* (2013.04); *G06F 2101/00* (2013.01); *G02B 2207/00* (2013.01); *G01R 29/0871* (2013.01); *G01R 33/028* (2013.01)

(58) Field of Classification Search
CPC ........ G02B 1/00; G02B 2207/00; G06F 1/00; G06F 2101/00; G06F 2200/00; G06F 2201/00; G06F 2413/00; G06Q 10/00; G06Q 2220/00; G06Q 2230/00

USPC .............. 315/39, 111.51, 236, 267, 344, 357; 324/113

See application file for complete search history.

(56) References Cited

U.S. PATENT DOCUMENTS

| | | | | |
|---|---|---|---|---|
| 4,877,999 A | * | 10/1989 | Knapp et al. | 315/248 |
| 4,894,589 A | * | 1/1990 | Borowiec | 315/248 |
| 4,894,590 A | * | 1/1990 | Witting | 315/248 |
| 5,519,565 A | * | 5/1996 | Kalt et al. | 361/280 |

(Continued)

FOREIGN PATENT DOCUMENTS

| | | |
|---|---|---|
| RU | 2280258 C1 | 7/2006 |
| WO | WO9746895 A1 | 11/1997 |

*Primary Examiner* — Huy Q Phan
*Assistant Examiner* — Temilade S Rhodes-Vivour
(74) *Attorney, Agent, or Firm* — John D. Gugliotta

(57) ABSTRACT

The invention relates to gas-discharge electrical instrumentation technology. The device for measuring electromagnetic field intensity comprises a measuring instrument for recording the glow of a gas discharge and a gas-discharge chamber that is formed between electrodes 1 and 2 separated by a dielectric 3. The electrode 1 is cylindrical, while the electrode 2 is in the form of a disk. The electrodes 1 and 2 are coupled to an electrical voltage source, wherein a capacitive element in the form of a pair comprising an antenna 5 and a connection to ground 6 is incorporated into the line coupling the cylindrical electrode 1 to the electrical voltage source. A capacitor 7 with variable capacitance is incorporated into the line coupling the cylindrical electrode 1 to the antenna 5. The technical result consists in providing the possibility of detecting a useful signal in a wide frequency range.

5 Claims, 2 Drawing Sheets

(56) References Cited

U.S. PATENT DOCUMENTS

| | | | |
|---|---|---|---|
| 5,638,084 A * | 6/1997 | Kalt | 345/31 |
| 6,204,545 B1 * | 3/2001 | Nakata | 257/459 |
| 2005/0077836 A1 * | 4/2005 | Jin et al. | 315/169.4 |
| 2005/0093481 A1 * | 5/2005 | Gao et al. | 315/248 |
| 2006/0220635 A1 | 10/2006 | Kazama et al. | |
| 2006/0285194 A1 * | 12/2006 | Moriyama et al. | 359/296 |
| 2007/0052636 A1 * | 3/2007 | Kalt et al. | 345/83 |
| 2008/0079424 A1 | 4/2008 | Kazama | |

* cited by examiner

DEVICE FOR MEASURING ELECTROMAGNETIC FIELD INTENSITY

TECHNICAL FIELD

The invention relates to gas-discharge electrical instrumentation technology and can be used, in particular, for obtaining objective data during biolocation.

BACKGROUND ART

A known device for detecting high-power microwave pulsed radiation can be used for establishing the fact of irradiation of an object with the specified radiation, which can result in damage to the object. Said device comprises a plate made of a conductive material and provided with one or more gaps therein. The gaps are filled with air or another dielectric. If the plate is subjected to pulsed radiation, the electromagnetic field intensity in the gaps is increased. If the field intensity exceeds the electrical strength of the dielectric in the gap, a gas-discharge breakdown occurs through the gap. The light flash that corresponds to the discharge is recorded on tape, see WO 9836286 A1.

The disadvantage of this technical solution consists in low sensitivity towards electromagnetic field (EMF) amplitude, because the EFM intensity must be quite high for the discharge to occur, since both sides of the gap have an identical original potential. Therefore EMF of moderate intensity is not recorded. In addition, the device has low sensitivity towards the incidence angle of the electromagnetic wave. When this angle deviates from the perpendicular relative to the longitudinal axis of the gaps, the sensitivity of the device is reduced to zero.

It should also be mentioned that said device only records the fact of presence or absence of the EMF and does not allow determining quantitative characteristics of the field.

Another device for measuring electromagnetic field intensity is more sensitive, said device comprising a gas-discharge chamber that is formed between electrodes separated by a dielectric. Both electrodes are cylindrical and are positioned coaxially. The cylinders are plugged on one side and positioned with the plugged ends facing outward inside a sealed dielectric envelope, wherein the ratio of diameters of the cylinders lies within the range $0.2 \leq d/D \leq 0.5$, where d and D are diameters of the internal and external electrodes, respectively, see SU 1335902 A1.

Due to cylindrical shape of the electrodes, the discharge is activated by a wave that falls within the range of 360°, the moment of breakdown is recorded by measuring the intensity of current. But the discharge in the narrow gap between the cylinders occurs when the following condition is fulfilled: $U_{applied\ field} > U_{breakdown}$, wherein $U_{breakdown} = E \cdot d$, where E–field intensity, d–gap width.

Thus in order to increase field sensitivity it is necessary to reduce the gap width, however significant reduction of the gap leads to a real possibility of short circuit. Sensitivity of the known device is insufficient, because it is limited by the geometric shape of the electrodes and the minimal allowed width of the gap therebetween.

A more sensitive device for measuring electromagnetic radiation field intensity comprises a gas-discharge chamber that is formed between electrodes separated by a dielectric, where one of the electrodes is cylindrical and the other electrode is in the form of a disk, vertical symmetry axis of the cylindrical electrode is perpendicular to the disk plane, and the ratio of diameter "d" of the cylindrical electrode to the diameter "D" of the electrode in the form of a disk is in the range $0.01 \leq d/D \leq 0.3$, wherein the electrodes are coupled to an electrical voltage source, and a capacitive element in the form of a pair comprising an antenna and a connection to ground is incorporated into the line coupling the cylindrical electrode to the electrical voltage source, see RU 2280258 C1.

This technical solution has been taken as a prototype of the present invention.

Incorporation of a capacitive element makes it possible to detect high-frequency components of a useful signal, because the capacitive element allows exciting electromagnetic oscillations in the electric circuit that are determined by the resonance frequency of the circuit comprising an antenna and a connection to ground.

The disadvantage of the prototype device consists in that the abovementioned circuit has a fixed resonance frequency, which does not allow detecting a useful signal in a wide range of frequencies. Besides, another disadvantage of the prototype consists in the absence of a possibility to remotely measure the electromagnetic field intensity, including its measurement in automatic mode.

SUMMARY OF THE INVENTION

It is an object of the present invention to provide a possibility for detecting a useful signal in a wide range of frequencies, as well as for performing remote measurement of electromagnetic field intensity in automatic mode.

According to the invention there is provided a device for measuring electromagnetic field intensity, which comprises a measuring instrument for recording the glow of a gas discharge and a gas-discharge chamber that is formed between electrodes separated by a dielectric, where one electrode is cylindrical, and the other electrode is in the form of a disk, said electrodes being coupled to an electrical voltage source, wherein a capacitive element in the form of a pair comprising an antenna and a connection to ground is incorporated into the line coupling the cylindrical electrode to the electrical voltage source; an electrically controlled capacitor with variable capacitance is used in the device; the electrode is made of a transparent current-conducting material, and the device additionally comprises a video camera, an analog-to-digital converter (ADC), a processor, a transceiver, one or several mobile terminals, a mobile Internet server and a current signal processing unit, wherein the output of the video camera is connected to the first input of the ADC, the output of the ADC is connected to the first input of the processor, the first output of the processor is connected to the first input of the transceiver, the second output of the processor is connected to the input of the electrical voltage source, the third output of the processor is connected to the input of the electrically controlled capacitor with variable capacitance, the first output of the transceiver is connected to the second input of the processor, the second output and the second input of the transceiver are connected through mobile communication channels to one or several mobile terminals, which are connected through a mobile Internet channel to the mobile Internet server, and the input of the current signal processing unit is connected to the electrode in the form of a disk, and the output of the current signal processing unit is connected to the second input of the ADC.

The applicant has not found any sources of information containing data on technical solutions identical to the present invention, which enables to conclude that the invention conforms to the criterion "Novelty" (N).

BRIEF DESCRIPTION OF THE DRAWINGS

The invention is further explained, by way of detailed description of examples of its embodiments, with reference to the following drawings, in which.

PREFERRED EMBODIMENT

Figure 1:
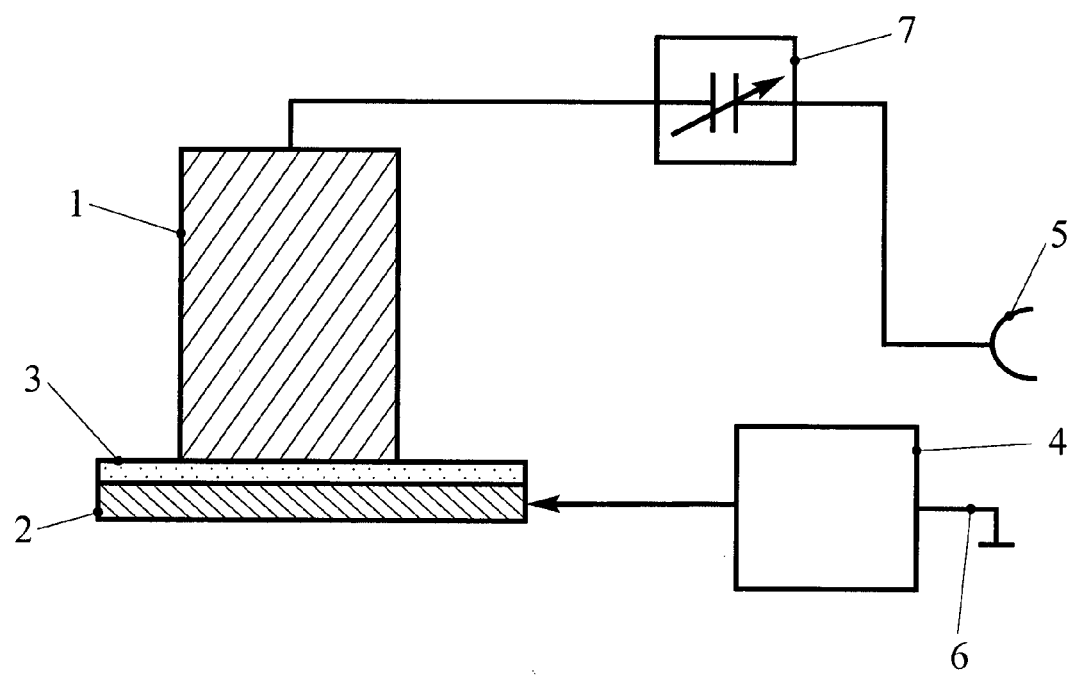
FIG. 1—is a scheme of the device according to claim 1.

The device comprises a measuring instrument for recording the glow of a gas discharge and a gas-discharge chamber that is formed between electrodes 1 and 2; electrode 1 is cylindrical, in this particular example it is made of titanium, which ensures its durability under conditions of a gas discharge. Electrode 1 can also be made of tungsten, niobium etc. Diameter of electrode 1 in this particular example is 10 mm. Electrode 2 is in the shape of a disk with diameter of 80 mm, which in an embodiment of the invention according to claim 1 is a metal plate. In an embodiment of the invention according to claim 3 the electrode 2 is made of a transparent current-conducting material, in particular a polymer material or a ultra-thin transparent metallic film, which is applied using spatter or deposition to the dielectric plate 3 that separates electrodes 1 and 2. Plate 3 is 3 mm wide and is made of quartz. Other dielectrics can be used, including glass. Vertical symmetry axis of the cylindrical electrode 1 is perpendicular to the plane of the electrode 2 in the form of a disk. The ratio of diameter "d" of the cylindrical electrode 1 to diameter "D" of the electrode made in the form of a disk is in the range $0.01 \leq d/D \leq 0.3$.

The specified ratio of diameters is stipulated by the following circumstances. Diameter "d" of electrode 1 can amount to 2-60 mm. When "d"<2 mm, the effects of non-uniformity of the cylinder edge begin to have an influence, which leads to redistribution of field intensity due to edge effect at the non-uniformities. Having "d" exceed 60 mm is impractical due to constructional and techno-economical reasons. Diameter "D" of electrode 2 is chosen according to constructional convenience and amounts to 30-200 mm. The conditions of development of a discharge under air pressure equalling atmospheric pressure or below stipulate that a space of at least 20 mm must be left from the edge of the upper electrode to the edge of the lower electrode. This is stipulated by the following formula that defines the relation between the length of surface discharge, specific surface capacitance, amplitude and inflection of applied voltage:

$$L = k \cdot C^2 \cdot U_0^5 \cdot V^{0.25},$$

where C—specific surface capacitance; 2 cm<L<10 cm—length of surface discharge; $U_0$—applied voltage; V—rate of voltage increase; k—coefficient that equals $21 \cdot 10^{13}$ for positive polarity and $13 \cdot 10^{13}$ for negative polarity, and depends on the material of the dielectric and the form of the applied voltage; the values of constants and, consequently, the characteristics of discharge figures are also influenced by the inflection of the leading edge and the duration of the voltage pulse.

Vertical symmetry axis of the cylindrical electrode 1 passes through the center of electrode 2, which ensures radial uniformity of the field and the absence of preferred directions during EMF recording.

Electrodes 1 and 2 are connected to an electrical voltage source 4; this particular example uses a generator of pulses "GDV Camera" with pulse height of 10-20 kV, duration of 10 μsec and ratio of 1000 Hz, which are supplied in bursts with duration of 0.5 sec, said generator is manufactured by ZAO "BioTechProgress" (St. Petersburg, Russia).

A capacitive element, which in this particular example is in the form of a pair comprising an antenna 5 and a connection to ground 6, is incorporated into the line coupling the electrode 1 to the electrical voltage source 4.

Incorporation of a capacitive element makes it possible to detect high-frequency components of a useful signal and eliminate interference caused by EMF of industrial frequencies, wherein the capacitive element in the form of an antenna 5 and a connection to ground 6 allows exciting electromagnetic oscillations in the electric circuit that are determined by the resonance frequency of the circuit comprising antenna 5 and connection to ground 6. A capacitor 7 with variable capacitance is incorporated into the line coupling the cylindrical electrode 1 to the antenna, which allows tuning to EMF of different frequency ranges. This increases selectivity of the device. The embodiment of the invention according to claim 1 uses a capacitor 7 of variable capacitance with mechanical control, the embodiment according to claims 2, 3 uses a capacitor 7 of variable capacitance with electrical control, wherein the device additionally comprises a video camera 8, in particular KPC400 manufactured by KTO-C Co (Korea), an ADC 9, such as AD9280 manufactured by Analog Device (USA), a processor 10, such as ATMEGA64 manufactured by ATMEL (USA), and a transceiver 11—MOTOROLA PC850 (USA). The device also comprises one or several mobile terminals 12. Mobile phones or computers provided with wireless communication means can be used as terminals 12. In the example illustrated in FIG. 1 only one terminal 12 is shown for the sake of simplicity. This particular example uses a mobile Internet server 13 such as USN Zeus Supermicro i7300 2*Xeon E7420/8G/no HDD/no ODD manufactured by CISCO (USA). Current signal processing unit 14 is embodied as a processor such as EPM 7128 manufactured by Alterra (USA).

The output of the video camera 8 is connected to the first input of the ADC 9, the output of the ADC 9 is connected to the first input of the processor 10, the first output of the processor 10 is connected to the first input of the transceiver 11; the second output of the processor 10 is connected to the input of the electrical voltage source 4, the third output of the processor 10 is connected to the input of the electrically controlled capacitor 7 with variable capacitance; the first output of the transceiver 11 is connected to the second input of the processor 10, the second output and the second input of the transceiver 11 are connected through mobile communication channels to one or several mobile terminals 12, which are connected over a mobile Internet channel to the mobile Internet server 13; the input of the current signal processing unit 14 is connected to the electrode 2, and the output of the current signal processing unit 14 is connected to the second input of the ADC 9.

In the embodiment shown in FIG. 1 the device functions in the following way. When the intensity of the EMF between electrodes 1 and 2 exceeds the breakdown voltage along the surface of the dielectric 3, an avalanche gas discharge is developed. The glow and/or current of the discharge is recorded using corresponding measuring instruments, for example a photomultiplier and/or a microampermeter. The measured values allow evaluating the EMF intensity value.

The electrical voltage source 4 allows creating voltage between electrodes 1 and 2 near the value of breakdown voltage, which results in the occurrence of a breakdown and the development of a gas discharge when the amplitude of the external EMF is relatively small; to obtain discharge figures, a series of bipolar voltage pulses can be supplied to the electrodes. In this case each pulse will create corresponding phase of the discharge, and the final picture will look like a superposition of images from positive and negative discharges (taking into account the distortion of electrical field by the positive surface charge left after previous discharges).

Using the capacitor 7 of variable capacitance the parameters of the circuit comprising the antenna 5 and the connection to ground 6 are changed in order to tune to the frequency of the EMF component to be measured. This allows detecting a useful signal in a wide frequency range.

Figure 2:
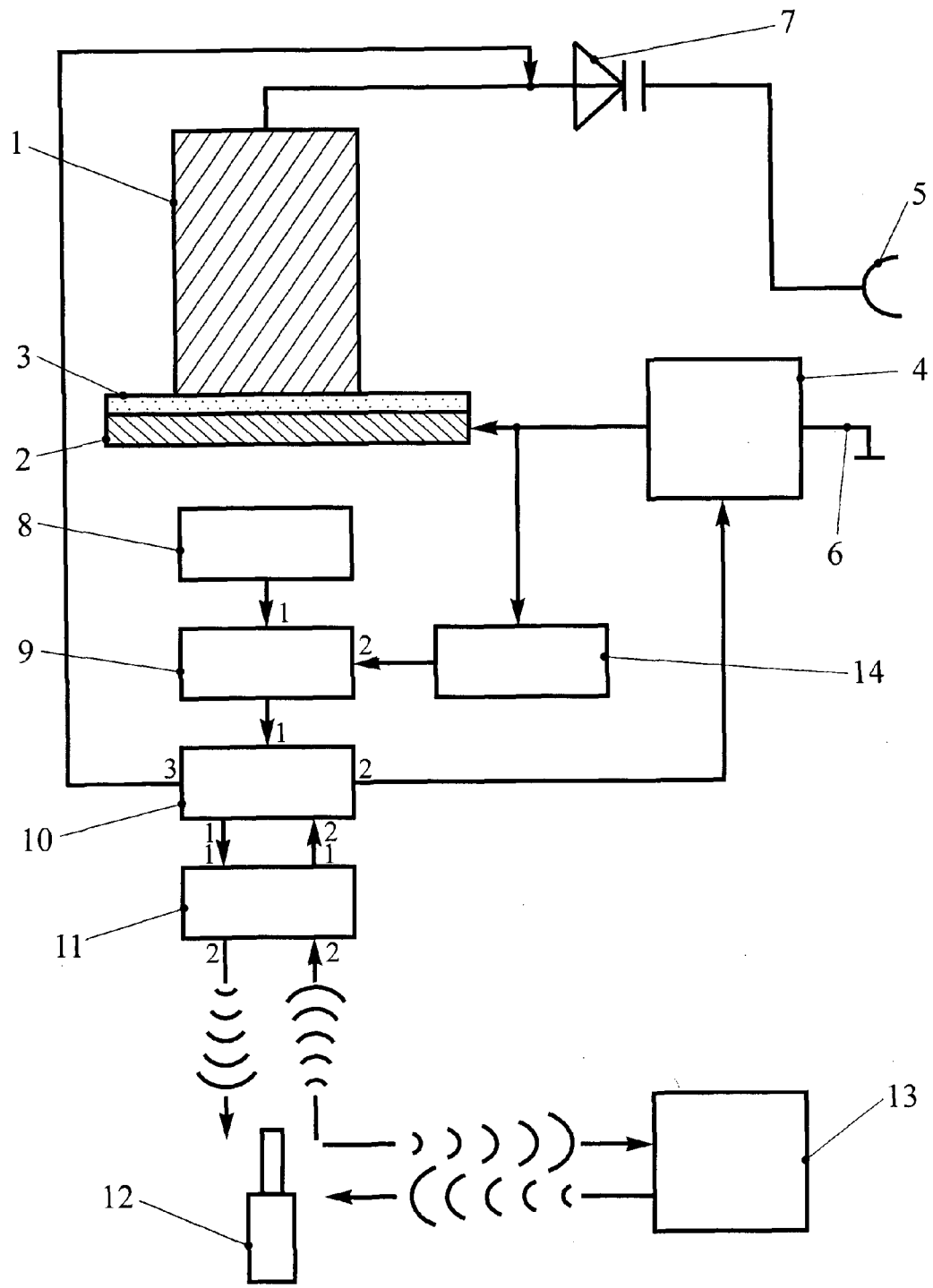
FIG. 2—is a scheme of the device according to claims 2 and 3.

In the embodiment shown in FIG. 2 the device functions in the following way. The gas-discharge glow enters the video camera 8 through the transparent plate 3 and electrode 2, whereupon it is transformed into digital code by the ADC 9, the signal from the ADC 9 is supplied to the processor 10, then the signal from the processor 10 is supplied to the transceiver 11 and to one or several mobile terminals 12, and further through the communications channel to the server 13, where the signal is processed and its parameters are determined, said parameters reflecting the two-dimensional geometric characteristics of the glow structures, as well as brightness characteristics. These characteristics depend on the measured intensity of the electromagnetic field and reflect the dynamics of its changes in the course of prolonged measurements. After processing on the server 13 is completed, the signal from the server 13 is supplied to the mobile terminal 12, where it can be further utilized by the consumer operator. This signal can also be used as a control signal for processor 10 through transceiver 11 by changing the parameters of operation of the electrical voltage source 4 and the variable capacitor 7 in order to increase sensitivity of the device and/or tune to the selected frequency range. The control signal can be generated automatically from the server 13 in accordance with a pre-defined program, for example a program for frequency scanning in specified time context, can be defined by the operator at the server 13 depending on the goals of the measurements, or defined by the operator from a mobile terminal 12.

Useful signal from electrode 2 is also recorded as an amplitude of high-frequency current by the current signal processing unit 14, digital signal from the output of said unit 14 is supplied to the processor 10, from the processor 10 the signal is supplied to the transceiver 11 and to one or several mobile terminals 12, and is supplied through a communications channel to the server 13, where the signal is processed and the parameters of the current are determined. These parameters depend on the measured intensity of the electromagnetic field and reflect the dynamics of its changes in the course of prolonged measurements.

INDUSTRIAL APPLICABILITY

The invention can be implemented by means of known component elements and construction materials. In applicant's opinion, this enables to conclude that the invention conforms to the criterion "Industrial Applicability" (IA).

The invention claimed is:

1. A device for measuring electromagnetic field intensity, Which comprises a measuring instrument for recording the glow of a gas discharge and a gas-discharge chamber that is formed between electrodes separated by a dielectric, where one electrode is cylindrical, and the other electrode is in the form of a disk, said electrodes being coupled to an electrical voltage source, wherein a capacitive element in the form of a pair comprising an antenna and a connection to ground is incorporated into the line coupling the cylindrical electrode to the electrical voltage source, characterized in that a capacitor with variable capacitance is incorporated into the line coupling the cylindrical electrode to the antenna, characterized in that an electrically controlled capacitor with variable capacitance is used and further characterized in that the electrode is made of a transparent current-conducting material, and the device additionally comprises a video camera, an analog-to-digital converter (ADC), a processor, a transceiver, one or several mobile terminals, a mobile Internet server and a current signal processing unit, wherein the output of the video camera is connected to the first input of the ADC, the output of the ADC is connected to the first input of the processor, the first output of the processor is connected to the first input of the transceiver, the second output of the processor is connected to the input of the electrical voltage source, the third output of the processor is connected to the input of the electrically controlled, capacitor with variable capacitance, the first output of the transceiver is connected to the second input of the processor, the second output and the second input of the transceiver are connected through mobile communication channels to one or several mobile terminals, which are connected through a mobile Internet channel to the mobile Internet server, and wherein the input of the current signal processing unit is connected to the electrode in the form of a disk, and the output of the current signal processing unit is connected to the second input of the ADC.

2. The device for measuring electromagnetic field intensity of claim 1, further comprising a measuring instrument for recording the glow of the gas discharge in the gas-discharge chamber that is formed between electrodes separated by a dielectric.

3. A device as claimed in claim 2, wherein said capacitive element comprises an electrically controlled capacitor having variable capacitance.

4. An apparatus for detecting a useful signal in a wide range of frequencies, as well as for performing remote measurement of electromagnetic field intensity in automatic mode, comprising:
 a measuring instrument for recording a glow of a gas discharge within a gas-discharge chamber that is formed between electrodes separated by a dielectric, wherein a first electrode is cylindrical, and a second electrode is a disk;
 said electrodes made of a transparent current-conducting material being coupled to an electrical voltage source, Wherein a capacitive element in the form of a pair comprising an antenna and a connection to ground incorporated into a line coupling the cylindrical electrode to the electrical voltage source;
 an electrically controlled capacitor with variable capacitance; and
 a video camera operatively connected to a measuring instrument; whereby the video camera output signal is thereby utilized for measuring EMF intensity value of said glow of said gas discharge.

5. The apparatus of claim 4, wherein said video camera further comprises an analog-to-digital converter (ADC), a processor, a transceiver, one or several mobile terminals, a mobile Internet server and a current signal processing unit, wherein the output or the video camera is connected to the first input of the ADC, the output of the ADC is connected to the first input of the processor, the first output of the processor is connected to the first input of the transceiver, the second output of the processor is connected to the input of the electrical voltage source, the third output of the processor is connected to the input of the electrically controlled capacitor with variable capacitance, the first output of the transceiver is connected to the second input of the processor, the second output and the second input of the transceiver are connected through mobile communication channels to one or several mobile terminals, which are connected through a mobile Internet channel to the mobile Internet server, and the input of the current signal processing unit is connected to the electrode in the form of a disk, and the output of the current signal processing unit is connected to the second input of the ADC.

* * * * *